(12) United States Patent
Bravi

(10) Patent No.: US 9,998,216 B2
(45) Date of Patent: Jun. 12, 2018

(54) SKEW MEASUREMENT IN AN OPTICAL COHERENT TRANSPONDER

(71) Applicant: Fujitsu Network Communications, Inc., Richardson, TX (US)

(72) Inventor: Emilio Bravi, Hillsdale, NJ (US)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 15/149,779

(22) Filed: May 9, 2016

(65) Prior Publication Data

US 2017/0324476 A1 Nov. 9, 2017

(51) Int. Cl.
*H04B 17/00* (2015.01)
*H04B 10/079* (2013.01)
*H04J 14/02* (2006.01)
*G01J 3/28* (2006.01)

(52) U.S. Cl.
CPC ........ *H04B 10/07955* (2013.01); *H04J 14/02* (2013.01); *G01J 3/28* (2013.01)

(58) Field of Classification Search
CPC ........ H04B 10/07955; H04J 14/02; G01J 3/28
USPC .......................................................... 398/38
See application file for complete search history.

(56) References Cited

U.S. PATENT DOCUMENTS

| 5,161,044 A * | 11/1992 | Nazarathy | H04B 1/62 398/194 |
|---|---|---|---|
| 5,526,158 A * | 6/1996 | Lembo | H04B 10/588 398/183 |
| 6,566,948 B1 * | 5/2003 | Braithwaite | H03F 1/3247 330/136 |
| 9,124,364 B1 * | 9/2015 | Sotoodeh | H04B 10/50577 |
| 2002/0191713 A1 * | 12/2002 | McVey | H04L 1/0041 375/301 |
| 2003/0175037 A1 * | 9/2003 | Kimmitt | G02F 1/0123 398/198 |
| 2004/0208635 A1 * | 10/2004 | Sinsky | H04B 10/505 398/183 |
| 2009/0233562 A1 * | 9/2009 | Kim | H04B 17/14 455/115.1 |
| 2011/0222850 A1 * | 9/2011 | Roberts | H04B 10/532 398/38 |

FOREIGN PATENT DOCUMENTS

EP 2713532 A1 * 4/2014 ........... H04B 10/616

* cited by examiner

*Primary Examiner* — Juan A Torres
(74) *Attorney, Agent, or Firm* — Baker Botts L.L.P.

(57) ABSTRACT

Systems and methods for measuring the in-phase/quadrature (I/Q) skew of optical signals. The method may be used to characterize the I/Q skew of optical signals transmitted by optical coherent transponders in complex modulation formats. The method may include providing an input signal to a transponder to produce a periodic (and generally sinusoidal) output signal, providing the output signal to a test system including an optical spectrum analyzer, measuring the optical power of a first harmonic of the signal, and comparing the measured optical power to calibration data to determine the I/Q skew. The optical power may be analyzed in a portion of the spectrum where sensitivity of the power to changes in skew is highest. The calibration data may map previously-obtained optical power measurements to corresponding known skew amounts. The system may provide more accurate skew measurements using less expensive equipment than existing skew measurement methods.

10 Claims, 9 Drawing Sheets

SKEW MEASUREMENT IN AN OPTICAL COHERENT TRANSPONDER

BACKGROUND

Field of the Disclosure

The present disclosure relates generally to optical communication networks and, more particularly, to systems and methods for measuring the in-phase/quadrature skew generated in optical coherent transponders.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include optical-electrical-optical (O-E-O) regeneration when the reach of an optical signal is limited and reconfigurable optical add-drop multiplexers (ROADMs).

In systems that convey information in the form of optical signals in optical coherent modulation formats (e.g., DP 16-QAM, DP-QPSK, etc.), the performance of the system is dependent on the relative phases of the In-phase/Quadrature (I/Q) components. Developers of components for optical networks might wish to measure the delay between the components of such signals, which is typically referred to as "skew". Existing skew measurement methods are not very accurate for complex modulation formats (such as 16-QAM), and the equipment needed to perform the measurements can be very expensive. For example, some existing skew measurement techniques rely on the use of expensive Optical Modulation Analyzers (OMAs).

SUMMARY

In one aspect, a disclosed method is for measuring in-phase/quadrature skew. The method may include providing, to an optical spectrum analyzer, an optical signal transmitted by an optical coherent transponder; performing, using the optical spectrum analyzer, a measurement of optical power for a harmonic of the optical signal with respect to a carrier of the optical signal; determining an amount of in-phase/quadrature skew introduced by the optical coherent transponder dependent on a result of the measurement; and generating an indication of the determined amount of in-phase/quadrature skew introduced by the optical coherent transponder.

In any of the disclosed embodiments, determining the amount of in-phase/quadrature skew introduced by the optical coherent transponder may include comparing a result of the measurement to a plurality of values in a mapping of optical power measurements to corresponding known in-phase/quadrature skew values; and determining the amount of in-phase/quadrature skew introduced by the optical coherent transponder dependent on a result of the comparing.

In any of the disclosed embodiments, the optical signal may be in a particular optical modulation format. The method may further include, prior to providing the optical signal to the optical spectrum analyzer, and for each of one or more other optical signals in the particular optical modulation format, each having a respective different known amount of in-phase/quadrature skew: providing, to the optical spectrum analyzer, the other optical signal; performing, using the optical spectrum analyzer, a respective measurement of optical power for a harmonic of the other optical signal with respect to a carrier of the other optical signal; and recording a result of the respective measurement of optical power in the mapping of optical power measurements to corresponding known in-phase/quadrature skew values. The result of the respective measurement may be recorded in the mapping in association with a skew value representing the respective different known amount of in-phase/quadrature skew.

In any of the disclosed embodiments, the method may further include determining, dependent on the plurality of values in the mapping, that optical power in a range of power values that includes the measurement of optical power is more sensitive to in-phase/quadrature skew on the side of the spectrum having a higher frequency with respect to the carrier of the optical signal than on the lower frequency side. Performing the measurement of optical power for the harmonic of the optical signal with respect to the carrier of the optical signal may include taking the measurement of optical power from the higher frequency side of the spectrum.

In any of the disclosed embodiments, the method may further include determining, dependent on the plurality of values in the mapping, that optical power in a range of power values that includes the measurement of optical power is more sensitive to in-phase/quadrature skew on the side of the spectrum having a lower frequency with respect to the carrier of the optical signal than on the higher frequency side. Performing the measurement of optical power for the harmonic of the optical signal with respect to the carrier of the optical signal may include taking the measurement of optical power from the lower frequency side of the spectrum.

In any of the disclosed embodiments, the optical signal transmitted by the optical coherent transponder may be a sinusoidal signal or a combination of sinusoidal signals produced by the optical coherent transponder in response to receiving an input signal that includes information representing a series including alternating values of zeros and ones.

In any of the disclosed embodiments, the method may further include, prior to providing the optical signal to the optical spectrum analyzer, initiating production of an input signal that includes information representing a series including alternating values of zeros and ones by pattern generation circuitry within the optical coherent transponder. The optical signal transmitted by the optical coherent transponder may be a sinusoidal signal or a combination of sinusoidal signals produced by the optical coherent transponder in response to the input signal.

In a further aspect, a system may include an optical spectrum analyzer and a skew detector. The optical spectrum analyzer may include circuitry to receive an optical signal transmitted by an optical coherent transponder under test; and perform a measurement of optical power for a harmonic of the optical signal with respect to a carrier of the optical signal. The skew detector may include circuitry to determine an amount of in-phase/quadrature skew introduced by the optical coherent transponder dependent on a result of the measurement; and generate an indication of the determined amount of in-phase/quadrature skew introduced by the optical coherent transponder.

In any of the disclosed embodiments, to determine the amount of in-phase/quadrature skew introduced by the optical coherent transponder, the skew detector may include circuitry to compare a result of the measurement to a plurality of values in a mapping of optical power measurements to corresponding known in-phase/quadrature skew values; and to determine the amount of in-phase/quadrature skew introduced by the optical coherent transponder dependent on a result of the comparing.

In any of the disclosed embodiments, the optical signal may be in a particular optical modulation format. The skew detector may further include circuitry to store, for each of one or more other optical signals in the particular optical modulation format, each having a respective different known amount of in-phase/quadrature skew, a result of a respective measurement of optical power performed by the optical spectrum analysis. The result of the respective measurement may be stored in association with a skew value representing the respective different known amount of in-phase/quadrature skew in a mapping of optical power measurements to corresponding known in-phase/quadrature skew values.

In any of the disclosed embodiments, the skew detector may further include circuitry to determine, dependent on a plurality of values in the mapping, that optical power in a range of power values that includes the measurement of optical power is more sensitive to in-phase/quadrature skew on the side of the spectrum having a higher frequency with respect to the carrier of the optical signal than on the lower frequency side. To perform the measurement of optical power for the harmonic of the optical signal with respect to the carrier of the optical signal, the skew detector may include circuitry to take the measurement of optical power from the higher frequency side of the spectrum.

In any of the disclosed embodiments, the skew detector may further include circuitry to determine, dependent on a plurality of values in the mapping, that optical power in a range of power values that includes the measurement of optical power is more sensitive to in-phase/quadrature skew on the side of the spectrum having a lower frequency with respect to the carrier of the optical signal than on the higher frequency side. To perform the measurement of optical power for the harmonic of the optical signal with respect to the carrier of the optical signal, the skew detector may include circuitry to take the measurement of optical power from the lower frequency side of the spectrum.

In any of the disclosed embodiments, the skew detector may further include circuitry to provide a signal representing a series including alternating values of zeros and ones to the optical coherent transponder as an input. The optical signal transmitted by the optical coherent transponder may be a sinusoidal signal or a combination of sinusoidal signals produced by the optical coherent transponder in response to receiving the input.

In any of the disclosed embodiments, the skew detector may further include circuitry to initiate production, by pattern generation circuitry within the optical coherent transponder, of an input signal representing a series including alternating values of zeros and ones. The optical signal transmitted by the optical coherent transponder may be a sinusoidal signal or a combination of sinusoidal signals produced by the optical coherent transponder in response to receiving the input signal.

In yet another aspect, a disclosed method is for producing an optical coherent transponder. The method may include communicatively coupling an optical coherent transponder built in accordance with a first design specification to a test system that includes an optical spectrum analyzer; determining, dependent on a first measurement made by the optical spectrum analyzer, an amount of in-phase/quadrature skew introduced by the optical coherent transponder; and determining whether or not the amount of in-phase/quadrature skew introduced by the optical coherent transponder can be compensated for by circuitry within the optical coherent transponder. In response to determining that the amount of in-phase/quadrature skew introduced by the optical coherent transponder cannot be compensated for in the optical coherent transponder, the method may include modifying the optical coherent transponder in accordance with a second design specification; communicatively coupling the modified optical coherent transponder to the test system; determining, dependent on a second measurement made by the optical spectrum analyzer, an amount of in-phase/quadrature skew introduced by the modified optical coherent transponder; and determining whether or not the amount of in-phase/quadrature skew introduced by the modified optical coherent transponder can be compensated for by circuitry within the modified optical coherent transponder.

In any of the disclosed embodiments, the method may further include repeating, one or more times while the amount of in-phase/quadrature skew introduced by the modified optical coherent transponder cannot be compensated for by circuitry within the modified optical coherent transponder: further modifying the optical coherent transponder; communicatively coupling the further modified optical coherent transponder to the test system; determining, dependent on a respective measurement made by the optical spectrum analyzer, an amount of in-phase/quadrature skew introduced by the further modified optical coherent transponder; and determining whether or not the amount of in-phase/quadrature skew introduced by the further modified optical coherent transponder can be compensated for by circuitry within the further modified optical coherent transponder.

In any of the disclosed embodiments, determining the amount of in-phase/quadrature skew introduced by the optical coherent transponder may include performing, using the optical spectrum analyzer, a measurement of optical power for a harmonic of an optical signal transmitted by the optical coherent transponder with respect to a carrier of the optical signal; and determining the amount of in-phase/quadrature skew introduced by the optical coherent transponder dependent on a result of the measurement.

In any of the disclosed embodiments, the optical signal may be in a particular optical modulation format. The method may further include, prior to performing the measurement and for each of one or more other optical signals in the particular optical modulation format, each having a respective different known amount of in-phase/quadrature skew: providing, to the optical spectrum analyzer, the other optical signal; performing, using the optical spectrum analyzer, a respective measurement of optical power for a harmonic of the other optical signal with respect to a carrier of the other optical signal; and recording a result of the respective measurement of optical power in a mapping of optical power measurements to corresponding known in-phase/quadrature skew values. The result of the respective measurement may be recorded in the mapping in association with a skew value representing the respective different known amount of in-phase/quadrature skew. Determining the amount of in-phase/quadrature skew introduced by the optical coherent transponder may be dependent on the mapping.

In any of the disclosed embodiments, determining the amount of in-phase/quadrature skew introduced by the optical coherent transponder may include comparing a result of the measurement to a plurality of values in a mapping of optical power measurements to corresponding known in-phase/quadrature skew values; and determining the amount of in-phase/quadrature skew introduced by the optical coherent transponder dependent on a result of the comparing.

In any of the disclosed embodiments, modifying the optical coherent transponder in accordance with a second design specification may include changing a value of a parameter of a finite impulse response (FIR) filter within the transponder that controls an amount of skew to be deliberately introduced in the optical coherent transponder.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
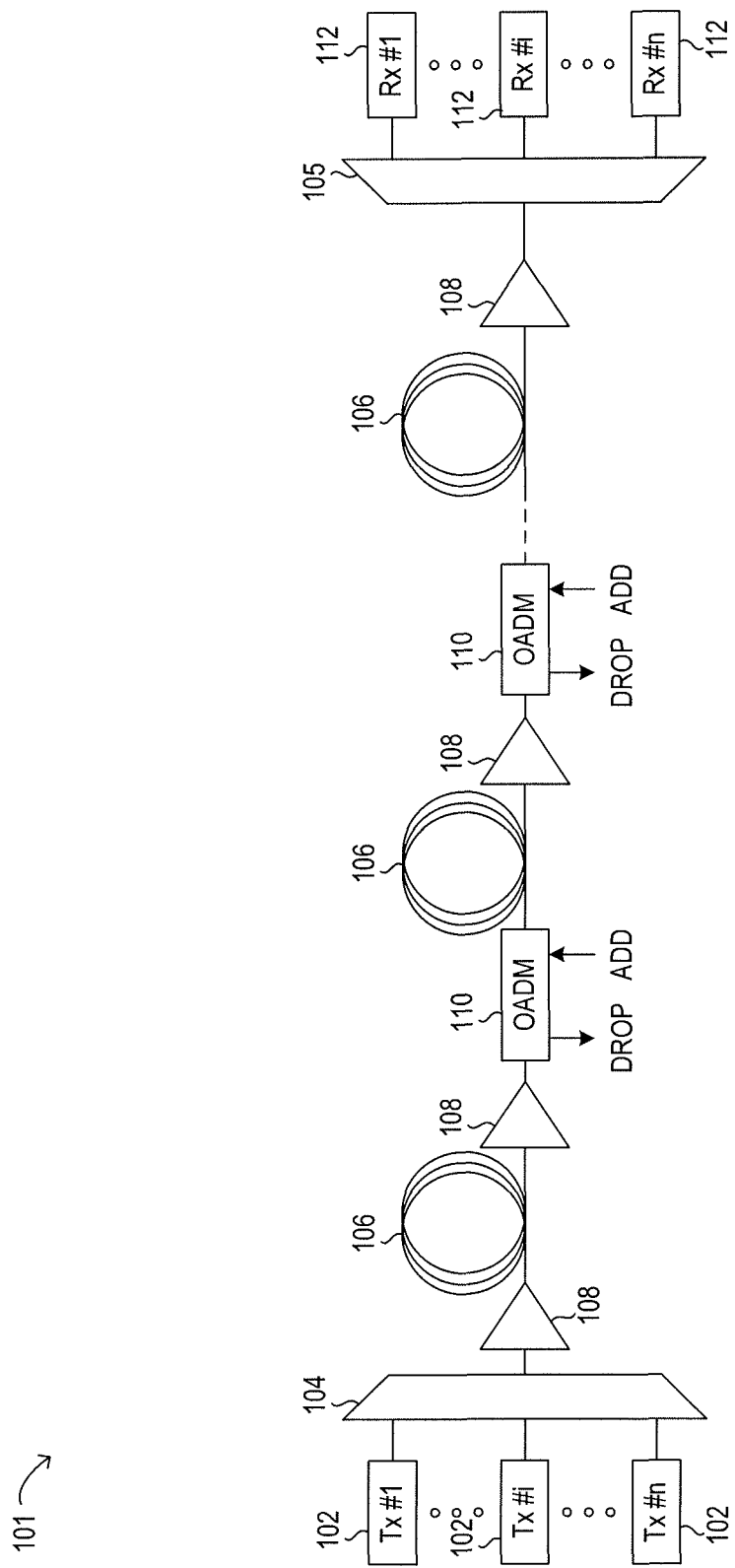
FIG. 1 is a block diagram of selected elements of an embodiment of an optical network, according to at least one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wide-band optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information included in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) included in the optical signals. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may provide achievement of a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may include a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information may be transmitted over an optical network is the bit rate of transmission. The higher the bit rate, the greater the transmitted information capacity. Achieving higher bit rates may be limited by the availability of wide bandwidth electrical driver technology, digital signal processor technology and increases in the required OSNR for transmission over optical network 101.

As noted above, an optical network (such as Optical network 101) may include one or more optical transmitters to transmit optical signals through the optical network in specific wavelengths or channels. In some embodiments, these transmitters may include optical transponders, each of which may include a laser and a modulator to receive electrical and/or optical signals. The optical transponders may modulate the information included in the signals they receive onto a beam of light produced by the laser at a particular wavelength, and may transmit the beam for carrying the signal throughout the optical network. In some embodiments, the optical transponders may also perform signal regeneration. In some embodiments, the optical transponders may interface with a host system over a parallel interface. In some embodiments, the optical transponders may convert full-duplex electrical signals that they receive to full-duplex optical signals. In other embodiments, the optical transponders may convert an optical signal at one wavelength to an optical signal at another wavelength. Each such wavelength-converting transponder may receive an optical data signal (e.g., as client traffic) and may convert it first into the electrical domain and then into an optical data signal at a different wavelength for transmission over the optical network. For example, the transponder may convert the signal into a signal at a wavelength that is supported in a specific system for transmission over a specific optical network, according to the optical modulation scheme(s) implemented in the system. In some embodiments, the wavelength-converted optical data signals generated by each of multiple transponders may be combined together into a multi-wavelength optical signal using an optical multiplexer.

The relative phases of the in-phase and quadrature (I/Q) components in optical coherent modulation formats may be referred to as "in-phase/quadrature skew", "I/Q skew", or simply "skew". The in-phase/quadrature skew of the signals transmitted by an optical coherent transponder is one of the parameters that determines the performance and quality of the transponder. Therefore, during design and/or production of an optical coherent transponder, measurements of the combined electrical and optical skew may be made to ensure that the transponder is within limits. However, as noted above, existing skew measurement methods are not very accurate for complex modulation formats, and the equipment needed to perform the measurements can be very expensive. In some embodiments of the present disclosure, a system and method for measuring skew (one that employs an Optical Spectrum Analyzer) may produce more accurate skew measurements than existing methods. In at least some embodiments, the skew measurements may also be much less expensive to take than those taken using existing skew measurement methods.

Figure 2:
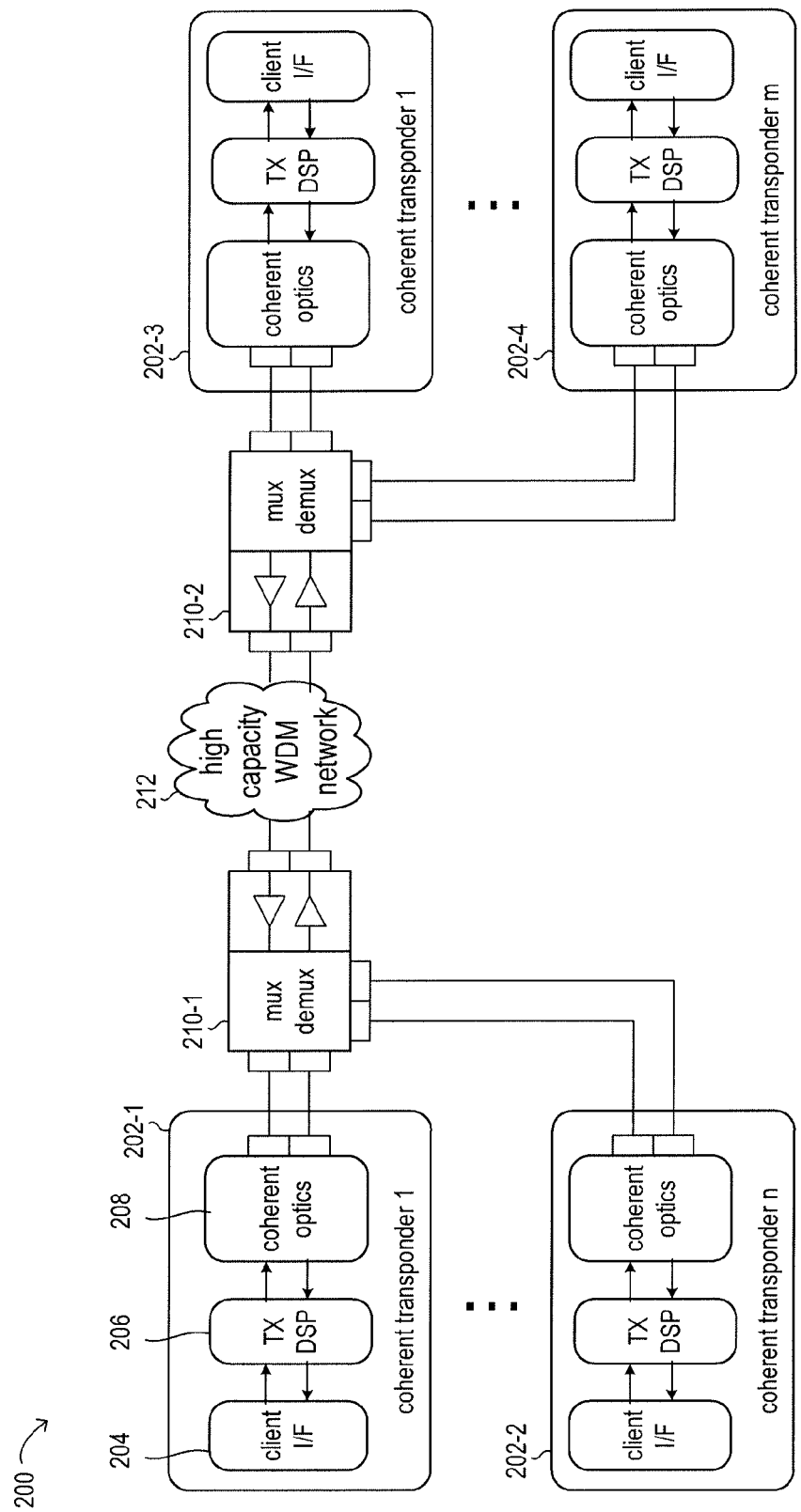
FIG. 2 is a block diagram of selected elements of a wavelength division multiplexing (WDM) system, according to at least some embodiments.

In some embodiments, an optical network (such as Optical network 101) may be implemented as a wavelength division multiplexing (WDM) system. In some such embodiments, the transmitters may include optical coherent transponders. In general, an optical coherent transponder is an optical transponder in which a fixed relation between the frequency and phase of the input and output signals is maintained or in which transmitted and received signals are in phase. FIG. 2 is a block diagram of selected elements of a WDM system 200, according to at least some embodiments. In this example embodiment, WDM system 200 includes multiple optical coherent transponders (shown as coherent transponders 202), including multiple optical coherent transponders 202 (labeled as coherent transponders 1-$n$ and coherent transponders 1-$m$, respectively) on each side of a high capacity WDM network 212. In this example embodiment, each of these coherent transponders 202 may implement the functionality of an optical transmitter, such as one of the optical transmitters 102 illustrated in FIG. 1.

Figure 3:
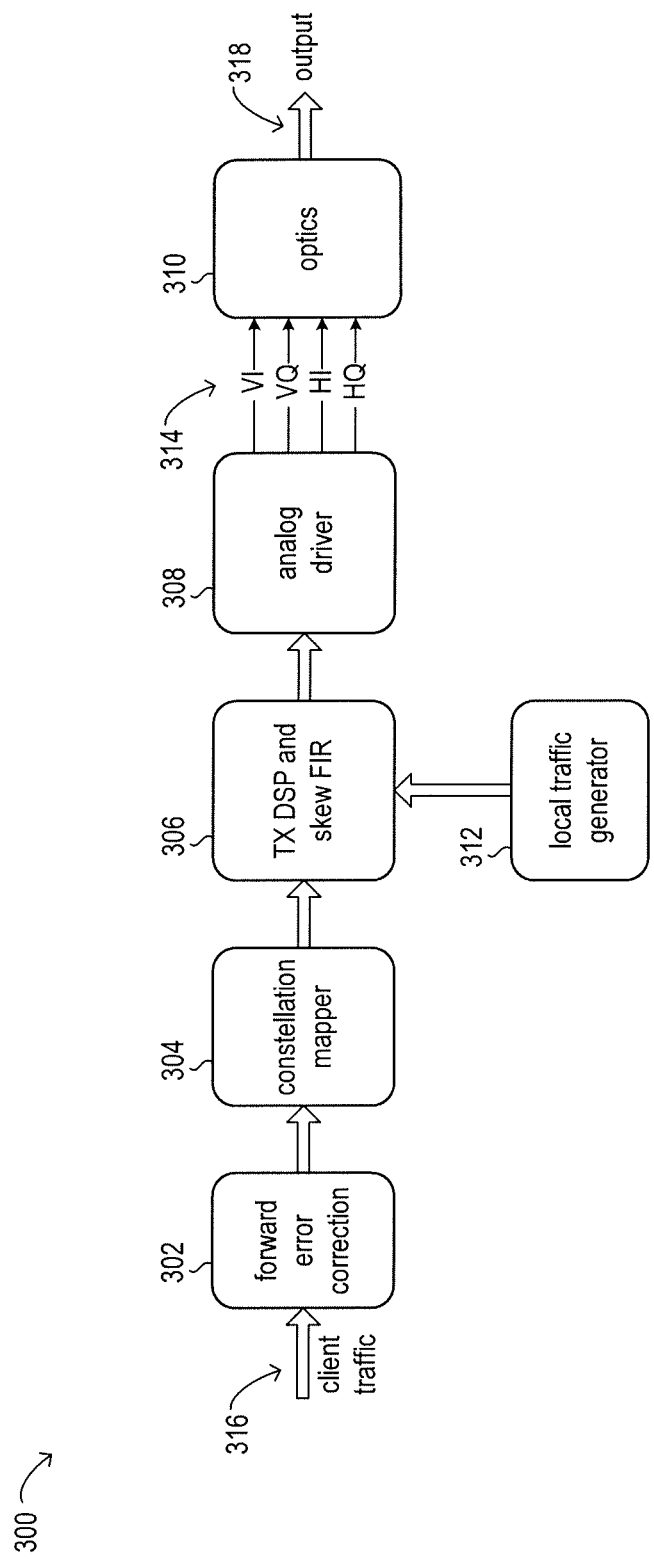
FIG. 3 is a block diagram of selected elements of a system for implementing an optical coherent transponder, according to at least some embodiments.

In this example embodiment, coherent transponder 202-1 includes a client interface 204 through which client traffic may be received (not shown). Coherent transponder 202-1 also includes a transmitter/DSP element 206, which may perform a variety of functions, including frequency equalization and pulse shaping. Coherent transponder 202-1 also includes a coherent optics element 208, which may include a laser, a splitter, and one or more modulators, in various embodiments. As illustrated this example embodiment, each of a plurality of other optical coherent transponders 202 (including coherent transponders 202-2, 202-3, and 202-4) may include substantially the same elements as those included in coherent transponder 202-1. A more detailed example of an optical coherent transponder and its components is illustrated in FIG. 3 and described below.

In this example embodiment, system 200 includes a multiplexer/demultiplexer (shown as a mux/demux element 210) on each side of the WDM network 212. In this example embodiment, each of these mux/demux elements 210 may implement the functionality of an optical multiplexer (such as multiplexer 104 illustrated in FIG. 1) and the functionality of an optical demultiplexer (such as demultiplexer 105 illustrated in FIG. 1). For example, mux/demux element 210-1 may be a system, apparatus or device to combine the signals transmitted by coherent transponders 202-1 and 202-2 (and any other coherent transponders 202 on the same side of WDM network 212) at respective individual wavelengths, into a WDM signal for transmission over WDM network 212.

A high-speed optical transmitter (such as one of the transmitters 102 illustrated in FIG. 1) may, in some embodiments, include an optical coherent transponder (such as one of the coherent transponders 202 illustrated in FIG. 2). FIG. 3 is a block diagram of selected elements of a system 300 for implementing an optical coherent transponder, according to at least some embodiments. In various embodiments, the coherent transponders 202 illustrated in FIG. 2 may include some or all of the elements of the optical coherent transponder system 300 illustrated in FIG. 3. In this example embodiment, optical coherent transponder system 300 may receive (as input) client traffic 316 and may produce an optical signal (shown as output 318) for transmission over an optical network. In some embodiments, the output signal 318 may be produced in an optical modulation format that is suitable for transmission in a wavelength division multiplexing system, such as WDM system 200 illustrated in FIG. 2.

In this example embodiment, the client traffic 316 coming into the transponder may include multiple digital or analog electrical signals containing information to be encoded onto an optical signal for transmission through phase and/or amplitude modulation, depending on the format. In some embodiments, the input may be a digital signal including a return-to-zero (RZ) or a non-return-to-zero (NRZ) encoding. These are encodings in which a value of "one" is represented by one significant condition (such as a positive voltage or a DC bias on the transmission line) while a value of "zero" is represented by some other significant condition (such as a negative voltage or the absence of bias), with or without an additional neutral or rest condition, respectively. In such embodiments, the client traffic 316 presented to the forward error correction element 302 and the constellation mapper 304 may be digital, but it may be converted to an analog signal to be modulated for transmission by subsequent elements within system 300.

In the example embodiment illustrated in FIG. 3, the forward error correction element 302 may include circuitry to correct transmission errors by adding redundancy to the messages it receives in the client traffic 316. The constellation mapper 304 may include circuitry to map a combination of bits at its input into multiple data signals that correspond to a specific symbol within the set of symbols that can be transmitted using a specific modulation format. In some embodiments, the constellation mapper may transform multiple input lines that carry on/off modulating signals (e.g., NRZ bits) into one complex multilevel modulation format (e.g., 16-QAM symbols) to be transmitted over two channels. For example, the constellation mapper may receive, in parallel, four bits for the H signal and four bits for the V signal. The constellation mapper may combine the four bits for the H signal into one symbol of the multilevel modulation format, and generate the corresponding HI and HQ signals. Similarly, the constellation mapper may combine the four bits for the V signal into one symbol of the multilevel modulation format, and generate the corresponding VI and VQ signals. The output of the constellation mapper may include the four signals HI, HQ, VI, and VQ.

In the example embodiment illustrated in FIG. 3, system 300 includes an alternate source of input for the signal to be modulated and transmitted by the optical coherent transponder, shown as local traffic generator 312. In some embodiments, local traffic generator 312 may include circuitry to generate input traffic (locally) representing a particular pattern. In other embodiments, local traffic generator 312 may be programmable to generate input traffic (locally) representing a specified pattern. For example, in a test mode or calibration mode, local traffic generator 312 may generate four signals, each representing a series that includes alternating values of zeros and ones (e.g., 01010101 . . . ), the four signals corresponding to HI, HQ, VI, and VQ. As in the client traffic case, the remaining elements of system 300 may transform these locally-generated signals for transmission over two channels.

In the example embodiment illustrated in FIG. 3, system 300 includes an element 306 comprising circuitry to perform the functions of a transmitter/DSP and a finite impulse response filter (more specifically, a skew FIR filter). In this example, element 306 may perform a variety of functions within the optical coherent transponder system 300, including, but not limited to, frequency equalization, pulse shaping, and/or deliberately introducing delays (skew) for each of the four signals HI, HQ, VI, and VQ independently. In this example, element 306 may receive the output of the constellation mapper 304 in order to transform client traffic 316 for transmission (e.g., during normal operation) or may receive the output of local traffic generator 312 (e.g., when operating in a test mode or calibration mode). The skew FIR shown within element 306 may be an electrical FIR including circuitry to introduce an additional amount of skew in the transponder. For example, in some embodiments, the skew FIR may be configurable or programmable to perform fine-tuning of the residual skew generated by the optical coherent transponder or to de-skew its output. In some embodiments, the transponder may include a programmable register or a location in a non-volatile memory (e.g., an EPROM or EEPROM) whose value controls the amount of skew introduced by the de-skewing filter in the transponder. By modifying the value of this register/location, the performance of the transponder may be improved.

In the example embodiment illustrated in FIG. 3, an analog driver 308 may include circuitry to adjust the four signals HI, HQ, VI, and VQ to drive electro-optical components within optics 310 (e.g., Mach-Zehnder modulators). More specifically, analog driver 308 may perform the functionality of an amplifier that boosts the four signals HI, HQ, VI, and VQ to generate amplified signals, and may adapt the impedances between the amplified signals and such modulators. The output of analog driver 308, shown collectively in FIG. 3 as signals 314, may be analog signals having the voltages required by modulators within optics element 310 to generate a modulated optical signal, shown as output 318.

In various embodiments, optics element 310 may include one or more lasers, splitters, modulators, and/or other circuit elements (not shown). In some embodiments, the output 318 of optics element 310 may be a signal that is a combination (sum) of the H and V polarizations generated by modulating the four signals HI, HQ, VI, and VQ produced by the preceding elements of optical coherent transponder system 300, and each polarization may be a 16-QAM signal. In such embodiments, one 16-QAM signal may be modulated to carry the information from the HI and HQ signals, while the other 16-QAM signal may be modulated to carry the information from the from the VI and VQ signals. In some embodiments, the H and V polarizations may be generated in substantially the same manner, except that the V polarization may then be rotated by 90 degrees. In some embodiments of the present disclosure, the skew measurement techniques described herein may be applied to measure the I/Q skew for one channel (polarization) at a time. In such embodiments, the channel (polarization) that is not being measured may be disabled or turned off during the measuring.

All of the components of system 300 illustrated in FIG. 3 may be considered part of the transponder (on the transmission side), at least in some embodiments. In other embodiments, the functionality of these components may be divided up differently among the components of an optical network or within an optical coherent transponder.

Some existing methods for measuring in-phase/quadrature skew rely on the use of an Optical Modulation Analyzer (OMA) to take the measurements. These instruments, though very expensive, have limited accuracy when measuring the skew for optical signals in advanced (complex) modulation formats. For example, the measurement resolution for an OMA is typically on the order of ±1 ps. Thus, any adjustment of the skew that is less than 1 ps is not likely be detected by the OMA. However, for certain classes of optical coherent transponders, the maximum acceptable combined transmission (TX) and reception (RX) skew over their usable life is on the order of 3 ps, and the transponder may not be error-free outside of this range. In general, any skew error may result in a transmission penalty that reduces the maximum error-free distance supported by the transponder, and the larger the skew error, the larger the penalty would be. The systems and methods described herein may be used to obtain a more accurate I/Q skew characterization of the combined electrical and optical skew than is possible using an OMA. In coherent transponders that employ a dual-polarization format (such as a format that includes a horizontal polarization H and a vertical polarization V), the methods described herein may be used to characterize the I/Q skew of either one of the two polarizations. These systems and methods, which may be less expensive to implement than skew measurement methods that rely on an OMA, may be used to ensure that an optical coherent transponder operates within acceptable limits. More specifically, disclosed herein is a high-resolution all-optical method to measure the combined optical-electrical I/Q skew generated at the transmitter (TX) in optical coherent transponders that is more accurate than existing skew measurement methods and that requires much less expensive equipment. For example, the optical method may employ an Optical Spectrum Analyzer (OSA), rather than a more expensive OMA.

In at least some embodiments, the method may be used during the manufacturing of an optical coherent transponder, or during its design, to ensure that the transponder introduces an amount of skew that is within a range of skew values that can be compensated for within the transponder itself. For example, in some embodiments, a skew FIR filter (such as that included in element 306 of the optical coherent transponder system 300 illustrated in FIG. 3) may, during the skew compensation, be able to compensate for skews of up to one-half symbol in order to optimize the transmission performance of the transponder. The systems and methods described herein for measuring skew may be dependent on an analysis of the properties of the optical spectrum generated by a transponder. More specifically, the method may include using an optical spectrum analyzer to measure the optical power of a first harmonic of a simulated sinusoidal wave (or a combination of sinusoidal signals) transmitted by the transponder and determining the skew with a resolution of up to ±0.01 ps based on the measured optical power of the first harmonic.

In one example embodiment, to demonstrate the method for measuring the skew between the electrical path of a specific optical coherent transponder and the optical path of the transponder, a local traffic generator of the transponder may be set to generate an input signal representing a series that includes alternating values of zeros and ones (e.g., 01010101, and so on) on both the in-phase and quadrature components of one of the channels (polarizations). In this example, the transponder would be set to generate these signals in phase. This input pattern represents a modulating electrical signal that is essentially a sinusoid, with most of the spectral content generated in the first harmonic. Therefore, the optical signal of each of the components I and Q, is phase-modulated by sinusoid. In this specific transponder, the symbol time is on the order of 32 ps. Therefore, the first harmonic is expected to be at about ±16 GHz from the carrier. In this example, the optical power of the first harmonic of the output is measured on both the positive and negative side of the spectrum (with respect to the carrier frequency) by the OSA. In this example, measurements have shown that, under this condition, a small variation in the skew causes a significant change in the power of the first harmonic. Measurements have also shown that, relative to the carrier, the effect of the skew on the power of the first harmonic on the lower frequency side and on the higher frequency side have opposite behavior.

Figure 4:
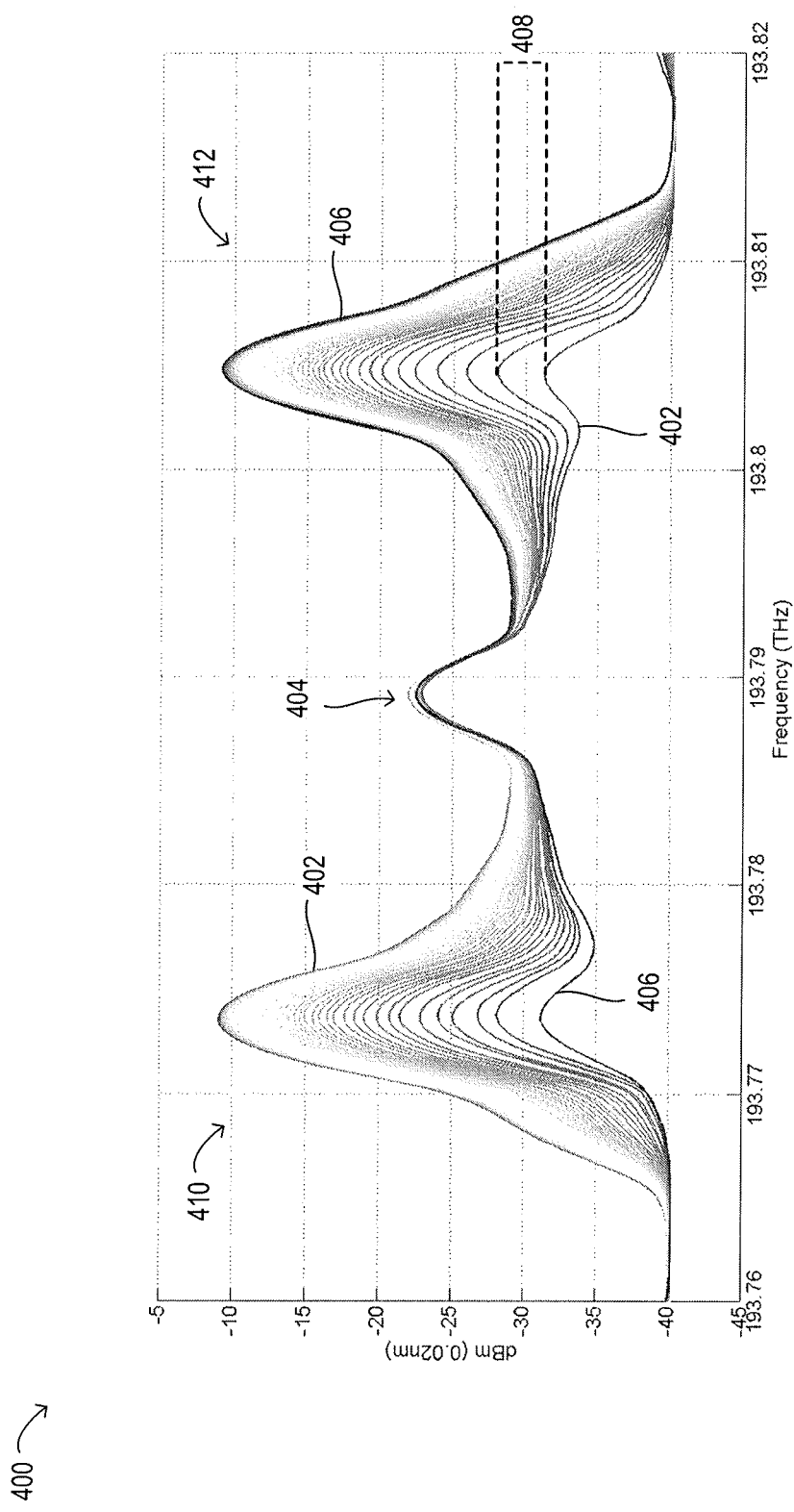
FIG. 4 illustrates example optical spectra when different amounts of skew are introduced by an optical coherent transponder, according to at least one embodiment.

FIG. 4 illustrates example optical spectra when different amounts of skew are introduced by the optical coherent transponder described above (one in which the symbol time is on the order of 32 ps). More specifically, graph 400 illustrates a collection of curves, each of which represents the optical power (measured in decibels referenced to one milliwatt) over the frequency spectrum for the first harmonic of an optical signal having a different amount of skew. In graph 400, each curve depicts the spectra measured by the spectrum analyzer for an optical signal transmitted by an optical coherent transponder in response to receiving an input signal representing a series that includes alternating values of zeros and ones (01010101, and so on) in each of the I and Q components and having a different (known) amount of skew. These curves are overlaid in the graph to represent different outputs of the spectrum analyzer when the input optical signal has different amounts of skew. In this example, the carrier signal (at frequency $f_c$) is shown at 404, and the left side of graph 400 (shown as 410) depicts the power of the first harmonic on the lower frequency side ($f_c-f_0$) with respect to the carrier signal. Conversely, the right side of graph 400 (shown as 412) depicts the power of the first hail tonic on the higher frequency side ($f_c+f_0$) with respect to the carrier signal (at frequency $f_c$).

As noted above, relative to the carrier, the power of the first harmonic on the lower frequency side and on the higher frequency side have opposite behavior. For example, one of the upper-most curves (curves depicting the highest optical power) on the lower frequency side of the carrier frequency at 404 (e.g., curve 402) becomes one of the lower-most curves (curves depicting the lowest optical power) on the higher frequency side of the carrier frequency at 404. Conversely, one of the lower-most curves on the lower frequency side of the carrier frequency at 404 (e.g., curve 406) becomes one of the upper-most curves on the higher frequency side of the carrier frequency at 404.

In this example, on the right side of graph 400 (shown as 412), for each successive curve going from bottom-to-top (e.g., beginning with curve 402 and moving toward curve 406), the amount of skew increases by 0.5 ps. On the left side of graph 400 (shown as 410), for each successive curve going from top-to-bottom (again beginning with curve 402 and moving toward curve 406), the amount of skew increases by 0.5 ps. As illustrated in this example, the change in the optical power of the first harmonic relative to the change in the amount of skew may vary over the frequency spectrum. In this example, the change in the optical power for each 0.5 ps increase in the skew is greater for the curves with the smaller amounts of skew on the right side of the graph (relative to the carrier frequency) than on the left side of the graph. Thus, the portion of the graph labeled as 412 may be considered the high-resolution range for these curves. Conversely, the change in the optical power for each 0.5 ps increase in the skew is greater for the curves with the larger amounts of skew on the left side of the graph (relative to the carrier frequency) than on the right side of the graph. Thus, the portion of the graph labeled as 410 may be considered the high-resolution range for these curves. In this example, in both cases, the high-resolution range includes optical power values between −35 dBm to −20 dBm.

As illustrated this example, a relatively small change in the amount of skew can result in a relatively large change in the power of the first harmonic. For example, a 0.5 ps skew change can result in up to a 4 dBm power change in the high-resolution range. This is illustrated in FIG. 4 by the difference (labeled 408) between the lowest two curves on the right hand side of graph 400. This example illustrates that, unlike with some existing skew measurement techniques that rely on equipment having an accuracy of only 1 ps, in a test system in which the power of the first harmonics is measured using an OSA with 0.08 dBm resolution (which is standard for some OSAs), it may be possible to achieve up to 10 fs resolution in the skew measurement (e.g., 4 dBm/ 0.08 dBm=50, therefore 0.5 ps/50=10 fs).

In some embodiments, the methods for measuring I/Q skew may be performed by a test system that includes an optical spectrum analyzer. The test system may also include a skew detector including circuitry to determine the amount of I/Q skew based on measurements of the optical power of the first harmonic of an optical signal that are taken by the optical spectrum analyzer. In some embodiments, a calibration of the test system for a given optical coherent transponder (or transponder design) under test may be performed by measuring the optical power in controlled conditions (e.g., using optical signals having known skew values) and creating a calibration table that maps optical power measurements to corresponding known in-phase/quadrature skew values. Note that, since the measured power will be relative to the carrier, it will be independent of the actual power level. This calibration process may be performed in a test mode or calibration mode in which the combined electrical and optical skew is characterized. For example, in one embodiment, a signal representing a series that includes alternating values of zeros and ones may be provided to (or generated by) an optical coherent transponder with known skew in a test or calibration mode, and the power of the first harmonic of the optical signal transmitted by the optical coherent transponder (which is a sinusoidal signal or a combination of sinusoidal signals) may be measured. The amount of skew introduced by the skew FIR filter in the transponder may then be increased and/or decreased (by a known amount) multiple times to create a mapping between optical power measurements and corresponding known amounts of in-phase/quadrature skew. This may include determining the optical power when the amount of skew introduced by the transponder is zero. Subsequently, the I/Q skew of the same optical coherent transponder, or of an optical coherent transponder designed to the same specifications as the transponder used to create the calibration data, may be determined by providing a signal representing a series including alternating values of zeros and ones to the transponder, measuring the optical power of the first harmonic, comparing it to the calibration data, and determining the amount of I/Q skew based on the comparison.

In some embodiments, a skew measurement technique based on measurements of the first harmonic of an optical signal transmitted by an optical coherent transponder based on a sinusoidal input may be applied separately to different components of an optical signal in a complex modulation format. For example, this skew measurement technique may be applied separately to the H and V components of an optical signal in a 16-QAM format, in some embodiments. In this example, a positive value of the I/Q skew for the H component may indicate that HQ is delayed with respect to HI, while a negative value of the I/Q skew for the H component may indicate that HI is delayed with respect to HQ. Similarly, a positive value of the I/Q skew for the V component may indicate that VQ is delayed with respect to VI, while a negative value of the I/Q skew for the V component may indicate that VI is delayed with respect to VQ.

As described above, in-phase/quadrature skew can cause power variation in the harmonics that have opposite behavior. For example, if, for a certain amount of skew, the power at $(f_c+f_0)$ is at a minimum, then the power at $(f_c-f_0)$ is at a maximum, and vice-versa. In some embodiments of the present disclosure, for a particular skew value, it may be possible to choose whether to perform the skew measurement with either the negative or the positive harmonic. This may allow the skew measurement to always be taken in the high-resolution range.

Figure 5:
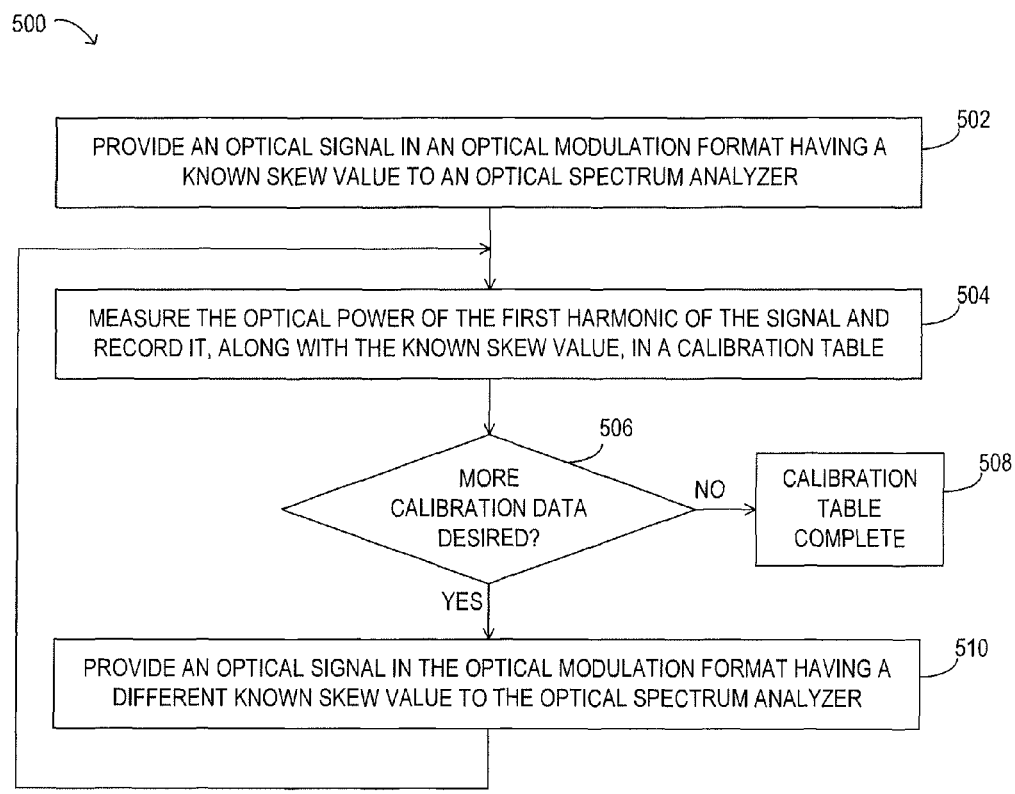
FIG. 5 is a flow diagram illustrating selected elements of a method for creating a calibration table to be used in measuring the relative phase of the In-phase/Quadrature (I/Q) components (the I/Q skew) of signals in optical coherent modulation formats, according to at least some embodiments.

FIG. 5 is a flow diagram illustrating selected elements of a method 500 for creating a calibration table to be used in measuring the relative phase of the In-phase/Quadrature (I/Q) components (the I/Q skew) of signals in optical coherent modulation formats, according to at least some embodiments. As illustrated at step 502, in this example, the method may include providing an optical signal in an optical modulation format having a known skew value to an optical spectrum analyzer. For example, in one embodiment, the optical signal provided to the OSA may include both an in-phase (I) and quadrature (Q) component of a signal in a 16-QAM format. The optical signal may be transmitted by an optical coherent transponder for which a relationship between skew and optical power is being calibrated. The method may also include, at step 504, measuring the optical power of the first harmonic of the signal and recording it, along with the known skew value, in a calibration table.

If (at step 506) more calibration data is desired, the method may include (at step 510) providing an optical signal in the optical modulation format having a different known skew value to the optical spectrum analyzer, and repeating (at step 504) the measuring the optical power of the first harmonic of that second input signal. The measured optical power for the second input signal may be recorded along with the different known skew value in the calibration table. For example, in some embodiments, the second input signal may be an optical signal in which the amount of skew is known to differ from the amount of skew in the first input signal by some fixed amount. The second input signal may have a higher amount of skew than the first signal or a lower amount of skew than the first signal, in various embodiments. While more calibration data is desired, the method may include repeating the operations shown in steps 510 and 504 one or more additional times as signals having different amounts of skew are provided to the OSA and the power of the first harmonic of each is measured and recorded. Once (at 506) all of the desired calibration data has been obtained, the calibration table may be complete (as in 508).

As previously noted, the methods described herein for measuring I/Q skew may be performed by a system (e.g., a test system) that includes an optical spectrum analyzer. In at least some embodiments, the methods may be dependent on an analysis of the properties of the optical spectrum generated by the transponder under particular conditions. This may include an analysis of a calibration table that is generated by a method similar to that illustrated in FIG. 5 and described above.

Figure 6:
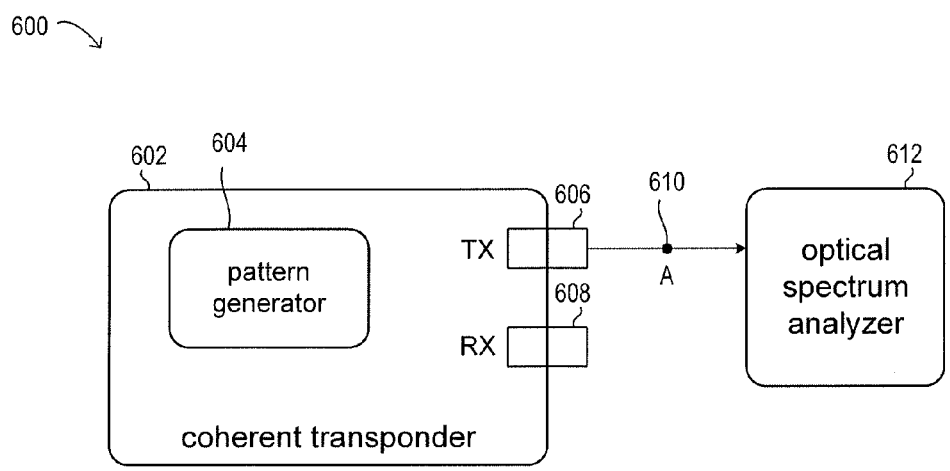
FIG. 6 is a block diagram of selected elements of a system for measuring the relative phase of the In-phase/Quadrature (I/Q) components (the I/Q skew) of signals in optical coherent modulation formats, according to at least some embodiments.

FIG. 6 is a block diagram of selected elements of a system 600 for measuring the relative phase of the In-phase/Quadrature (I/Q) components (the I/Q skew) of signals in optical coherent modulation formats, according to at least some embodiments. In at least some embodiments, system 600 may be used to measure the total I/Q skew of a coherent transponder. In the example embodiment illustrated in FIG.

6, system 600 includes an optical spectrum analyzer 612 and a coherent transponder under test (shown as coherent transponder 602), for which the I/Q skew is to be determined. In this example, coherent transponder 602 includes a pattern generator 604, a transmitter 606, and a receiver 608.

In this example, the output of transmitter 606 is an optical signal produced by coherent transponder 602 in response to a digital signal generated (locally) by pattern generator 604. In some embodiments, the pattern generator 604 of coherent transponder 602 may be set to generate a signal representing a series that includes alternating values of zeros and ones on both the I and Q components, where all patterns are in phase. In other embodiments, other input patterns may be used. In this example, the output of transmitter 606 is provided to optical spectrum analyzer 612, which measures the optical power of the first harmonic of the output of transmitter 606 as seen at point A (610). In other words, system 600 may be used to measure the characteristics of the optical spectrum at point A (610). Based on the measurement, and on calibration data previously obtained, the skew between the I/Q components of the optical signal transmitted by coherent transponder 602 may be determined.

In some embodiments, system 600 may include logic and/or circuitry to determine (e.g., automatically) the I/Q skew, based on the measurement of the optical power of the first harmonic of the signal transmitted by transmitter 606, and on calibration data that was obtained previously (e.g., during a calibration exercise). In some embodiments, this skew detection logic/circuitry may be included in optical spectrum analyzer 612 (not shown). In other embodiments, this skew detection logic/circuitry may be included, along with optical spectrum analyzer 612, in a test system that is used to characterize optical coherent transponders during design, during manufacturing, and/or during production use to ensure that the optical coherent transponders operate within acceptable limits.

In some embodiments, the skew detection logic/circuitry may include one or more programmable elements for which various parameters may be changed through the execution of test software or production software. For example, in some embodiments, a test system may implement an application programming interface that allows a user to specify a pattern to be generated by pattern generator 604, to select pattern generator 604 (as opposed to client traffic) as the source of the signal to be modulated and transmitted by transponder 602, and/or to specify a parameter of a skew FIR filter within transponder 602 (not shown) that controls the amount of skew that is deliberately and explicitly introduced in order to perform fine-tuning of the residual skew generated by the optical coherent transponder or to de-skew the signal transmitted by transponder 602. In such embodiments, program instructions may be executed by a processor in the test system (or in a computer that drives the test system) to cause the programmable elements to be configured in particular ways while in a test or calibration mode and/or while in a production mode or in normal operation. For example, in some embodiments, the test system (which may be a test bench or piece of test equipment) may include (in addition to an OSA and/or skew detection logic/circuitry) a command interface and a display (for displaying optical power spectra). The test system may be communicatively coupled to a processor or computer that provides commands to the OSA and/or to skew detection logic/circuitry and receives output (e.g., optical power measurements and/or skew values) from the OSA and/or skew detection logic/circuitry, respectively. In some embodiments, program instructions may be executed by the processor or computer to compare measured values to values in a calibration table that was previously created, to determine the I/Q skew based on the comparison, and/or to return or display the determined amount of IQ skew.

Figure 7:
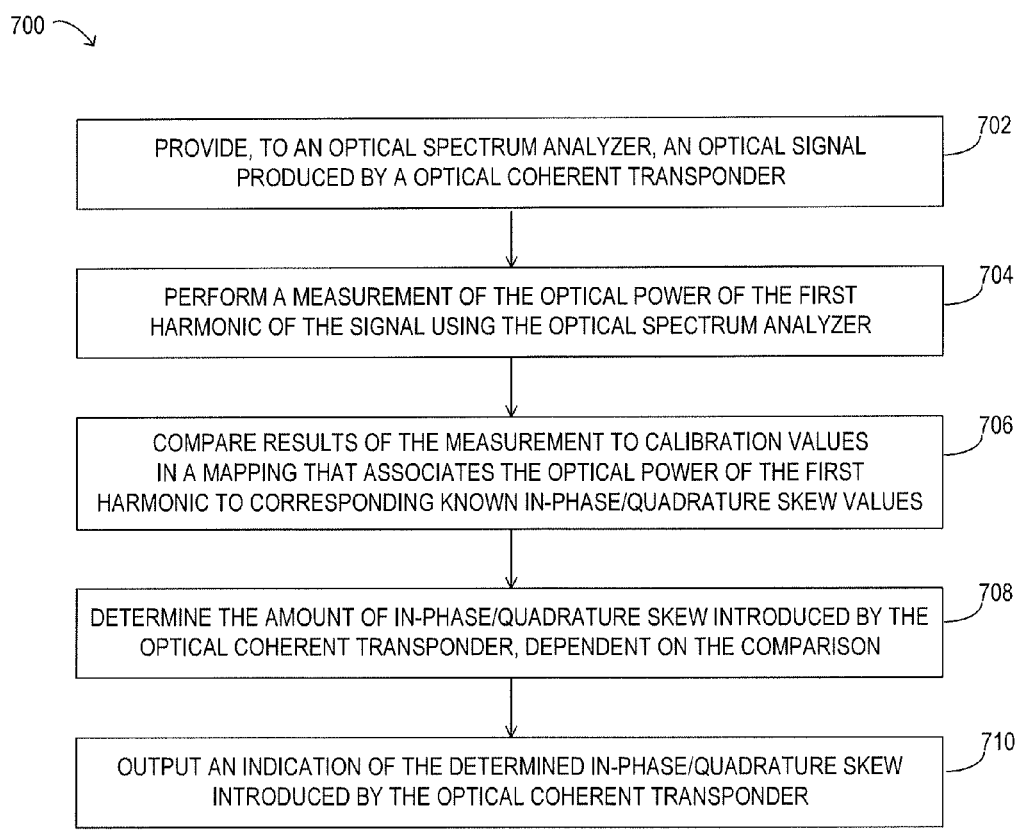
FIG. 7 is a flow diagram illustrating selected elements of a method for measuring the skew between the electrical path of a transponder and the optical path of the transponder, according to at least some embodiments.

FIG. 7 is a flow diagram illustrating selected elements of a method 700 for measuring the skew between the electrical path of a transponder and the optical path of the transponder, according to at least some embodiments. As illustrated at step 702, in this example, the method may include providing, to an optical spectrum analyzer, an optical signal produced by an optical coherent transponder. For example, the optical signal may be a simulated sinusoidal wave (or a combination of sinusoidal signals) transmitted by the transponder. In at least some embodiments, the optical spectrum analyzer may be a component of a test bench, or a piece of test equipment that can be used to measure the skew between the electrical path of a transponder and the optical path of the transponder, as described herein. In some embodiments, the test bench or piece of test equipment may also include skew detection logic/circuitry and/or other elements, as described herein.

As illustrated in this example, the method may include (at 704) initiating a measurement of the optical power of the first harmonic of the signal using the optical spectrum analyzer. The method may also include (at 706) comparing the measured value of the optical power of the first harmonic of the signal to calibration values associating the optical power of the first harmonic to corresponding in-phase/quadrature skew values. At 708, the method may include determining the in-phase/quadrature skew introduced by the optical coherent transponder, dependent on the comparison. This may include, for example, determining that the measured optical power with respect to the carrier corresponds to a skew value found in (or extrapolated from) the calibration data. The method may also include (at 710) outputting an indication of the determined in-phase/quadrature skew introduced by the optical coherent transponder. For example, in some embodiments, the method may include displaying a value representing the determined I/Q skew. In other embodiments, the method may include returning a value representing the determined I/Q skew the processor/computer that initiated the measurement for subsequent analysis or other uses.

As described above, the behavior of an optical coherent transponder (or, more specifically, the changes in optical power due to variations in skew) on the positive side of the spectrum ($f_c+f_0$) and the negative side of the spectrum ($f_c-f_0$) are opposite. In some embodiments, if, while analyzing the power on the positive side (for example) the power change tends to saturate at some point due to skew, the method may include analyzing the power on the negative side instead. In other words, the method may include performing the analysis to determine the I/Q skew on the portion of the curves in which the changes in power have been observed to be more sensitive to changes in I/Q skew. In an embodiment in which the OSA can measure variations in the optical power as small as 0.08 dBm, the skew measurement techniques described herein may (following the calibration of the test system for the optical coherent transponders under test) achieve skew measurements with up to 10 fs resolution.

Figure 8:
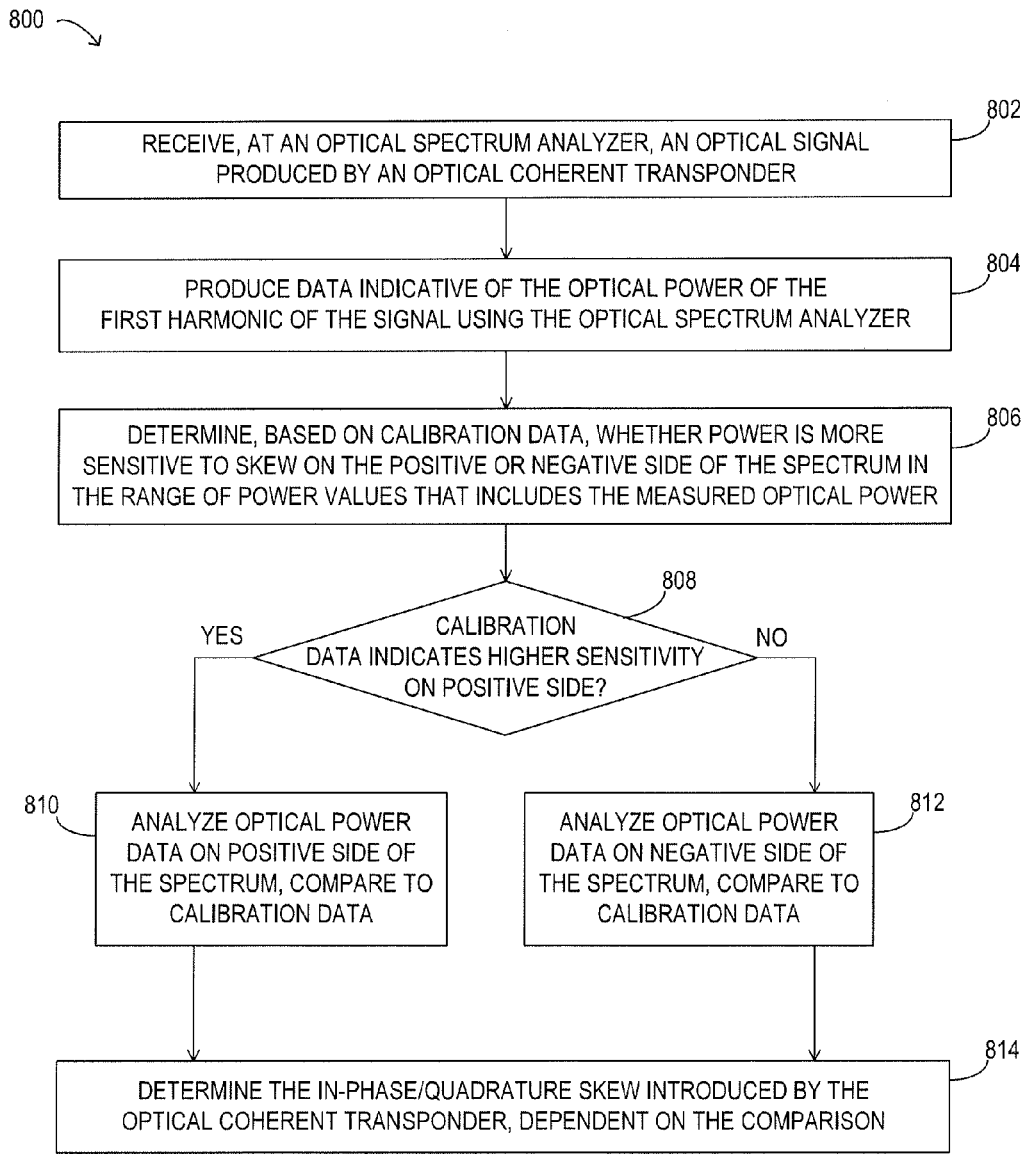
FIG. 8 is a flow diagram illustrating selected elements of a method for measuring I/Q skew that includes analyzing the positive or negative side of an optical spectrum, according to at least some embodiments.

FIG. 8 is a flow diagram illustrating selected elements of a method 800 for measuring I/Q skew that includes analyzing the positive or negative side of an optical spectrum, according to at least some embodiments. As illustrated at step 802, in this example, the method may include receiving, at an optical spectrum analyzer, an optical signal produced by an optical coherent transponder. The method may include producing data indicative of the optical power of the first harmonic of the signal using the optical spectrum analyzer (as in 804), and determining, based on calibration data, whether the optical power is more sensitive to skew on the positive or negative side of the spectrum in the range of power values that includes the measured optical power (as in 806).

In this example, if (at 808) the calibration data indicates a higher sensitivity on the positive side of the spectrum, the method may include (at 810) analyzing the optical power data on the positive side of the spectrum, and comparing it to calibration data. The calibration data may associate values for the optical power of the first harmonic to corresponding in-phase/quadrature skew values. If (at 808) the calibration data indicates higher sensitivity on the negative side of the spectrum, the method may include (at 812) analyzing the optical power data on the negative side of the spectrum, and comparing it to the calibration data. In either case, the method may include determining (at 814) the in-phase/quadrature skew introduced by the optical coherent transponder, dependent on the comparison.

In some embodiments, the test systems and methods described herein may be used during manufacturing of an optical coherent transponder to obtain a more accurate measurement of the I/Q skew in optical signals transmitted by the transponder than is possible using existing skew measurement methods. In some embodiments, once the amount of skew is known, steps may be taken to compensate for the skew (if needed). For example, if the measured amount of skew is less than a predetermined threshold, there may be no need to add or modify any elements of the transponder to cause the transponder to operate within acceptable limits. However, if the measured amount of skew is more than a predetermined threshold, one or more elements of the transponder may be added or modified to cause the transponder to operate within acceptable limits.

In some embodiments, the test systems and methods described herein may be used to obtain a more accurate measurement of the I/Q skew in optical signals transmitted by an optical coherent transponder than is possible using existing skew measurement methods during the design of the transponder. For example, these methods may be used during prototyping to determine if the amount of I/Q skew in the optical signals transmitted by an optical coherent transponder that is built according to a particular design specification can be compensated for when the transponder goes into production. If not, the design specification may be modified and a modified prototype may be built and tested. This process may be repeated until the amount of I/Q skew in the optical signals transmitted by one of the prototypes is within the acceptable limits for the I/Q skew. In general, the test systems and methods described herein may be used at any time to obtain a more accurate measurement of the I/Q skew in optical signals transmitted by an optical coherent transponder than is possible using existing skew measurement methods, and using less expensive equipment than existing skew measurement methods.

Figure 9:
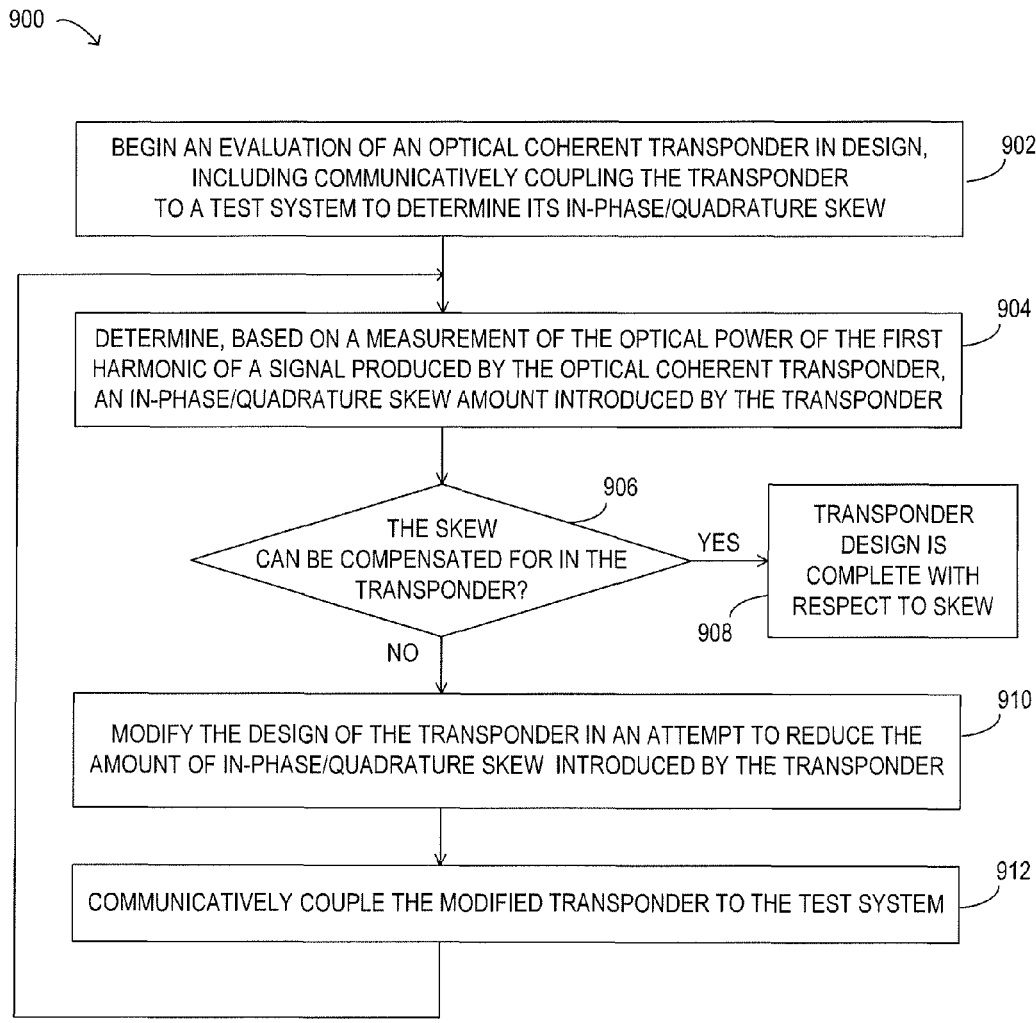
FIG. 9 is a flow diagram illustrating selected elements of a method for designing an optical coherent transponder with acceptable skew, according to at least some embodiments.

FIG. 9 is a flow diagram illustrating selected elements of a method 900 for designing an optical coherent transponder with acceptable skew, according to at least some embodiments. As illustrated at step 902, in this example, the method may include beginning an evaluation of an optical coherent transponder that is in design, including communicatively coupling the transponder to a test system to determine the amount of in-phase/quadrature skew that is introduced by the transponder. In various embodiments, the test system may include an optical spectrum analyzer, a skew detector (such as those described herein), a processor or computer to execute program instructions, and/or other components. The method may also include (at 904) determining, based on a measurement of the optical power of the first harmonic of a signal produced by the optical coherent transponder, an in-phase/quadrature skew amount introduced by the transponder.

If (at 906) it is determined that the amount of skew introduced by the transponder cannot be compensated for in the transponder, the method may include (at 910) modifying the design of the transponder in an attempt to reduce the amount of in-phase/quadrature skew introduced by the transponder. In this case, the method may also include communicatively coupling the modified transponder to the test system (as in 912) and repeating the operations shown in 904-910, as applicable. In some embodiments, the operations shown as 910, 912, and 904 may be repeated one or more times while the amount of skew introduced by the modified transponder remains too large to be compensated for in the transponder itself. If, or once, (at 906) it is determined that the amount of skew introduced by the transponder can be compensated for in the transponder, the transponder design may be complete with respect to the acceptable amount of skew (as in 908).

As described herein, in some embodiments of the present disclosure, a high-resolution all-optical method may be used to measure the combined optical-electrical I/Q skew for optical signals generated at the transmitter of an optical coherent transponder that is more accurate than existing skew measurement methods and that requires much less expensive equipment than existing skew measurement methods. In at least some embodiment, the method may include measuring the optical power of a first harmonic of a signal in a complex modulated format that is transmitted by an optical coherent transponder that is under test in a test system that includes an optical spectrum analyzer and skew detection logic/circuitry. The measured power may be compared to calibration data mapping optical power to corresponding I/Q skew values to determine the I/Q for the transponder under test. In at least some embodiments, the method may employ an analysis of a double-side optical spectrum that is produced by the optical spectrum analyzer to select the side of the spectrum having the best resolution for a certain range of skew values.

In some embodiments, the skew measuring methods described herein may be provided as a service to developers of transponders (including transponders that comply with C form-factor pluggable (CFP) multi-source agreements or variants thereof), or other types of equipment used in optical communication networks. For example, a service may be provided to characterize prototypes of various products to ensure that they meet applicable requirements for I/Q skew (e.g. less than one-half symbol skew), using the test systems and methods described herein.

While various test systems and skew measurement methods are described herein primarily in terms of their use in characterizing optical coherent transponders by analyzing measurements of the optical power of first harmonics of optical signals transmitted by the transponder, in other embodiments, the methods may include analyzing measurements of the optical power of other harmonics of the optical signals (e.g., second harmonics and beyond) instead of, or in addition to, analyzing measurements of the optical power of the first harmonics of the optical signals. In addition, while these test systems and skew measurement methods are described herein primarily in terms of their use in characterizing optical coherent transponders, in other embodiments, these systems and techniques may be used to determine the skew in other types of systems that generate two phase-coherent optical signals (to be subsequently combined) for which it may be useful to determine the skew. As in the case in which the method is used to characterize a transponder, the I/Q skew in another type of system under test may be characterized by providing a sinusoidal input to the system, measuring (using an optical spectrum analyzer) the optical power spectrum of one or more of the harmonics of a sinusoidal output of the system, and (using previously obtained calibration data) determining the amount of skew based on the measured optical power.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for measuring in-phase/quadrature skew, the method comprising:
   providing, to an optical spectrum analyzer, an optical signal transmitted by an optical coherent transponder;
   generating, using the optical spectrum analyzer, measurement data indicating the optical power for a harmonic of the optical signal with respect to a carrier of the optical signal;
   determining, dependent on the plurality of values in a mapping of optical power measurements to corresponding known in-phase/quadrature skew values, that optical power in a range of power values is more sensitive to in-phase/quadrature skew on the side of the spectrum having a higher frequency with respect to the carrier of the optical signal than on the lower frequency side;
   comparing a result of the measurement data from a higher frequency side of the spectrum to the mapping of optical power measurements;
   determining an amount of in-phase/quadrature skew introduced by the optical coherent transponder dependent on a result of the comparing; and
   generating an indication of the determined amount of in-phase/quadrature skew introduced by the optical coherent transponder.

2. The method of claim 1, wherein:
   the optical signal is in a particular optical modulation format; and
   the method further comprises, prior to providing the optical signal to the optical spectrum analyzer, and for each of one or more other optical signals in the particular optical modulation format, each having a respective different known amount of in-phase/quadrature skew:
   providing, to the optical spectrum analyzer, the other optical signal;
   performing, using the optical spectrum analyzer, a respective measurement of optical power for a harmonic of the other optical signal with respect to a carrier of the other optical signal; and
   recording a result of the respective measurement of optical power in the mapping of optical power measurements to corresponding known in-phase/quadrature skew values, the result of the respective measurement being recorded in the mapping in association with a skew value representing the respective different known amount of in-phase/quadrature skew.

3. The method of claim 1, wherein the optical signal transmitted by the optical coherent transponder is a sinusoidal signal or a combination of sinusoidal signals produced by the optical coherent transponder in response to receiving an input signal comprising information representing a series of alternating values of zeros and ones.

4. The method of claim 1, wherein:
   the method further comprises, prior to providing the optical signal to the optical spectrum analyzer:
   initiating production of an input signal comprising information representing a series including alternating values of zeros and ones by pattern generation circuitry within the optical coherent transponder; and
   the optical signal transmitted by the optical coherent transponder is a sinusoidal signal or a combination of sinusoidal signals produced by the optical coherent transponder in response to the input signal.

5. A system, comprising:
   an optical spectrum analyzer comprising circuitry to:
   receive an optical signal transmitted by an optical coherent transponder under test; and
   generate measurement data indicating the optical power for a harmonic of the optical signal with respect to a carrier of the optical signal; and
   a skew detector comprising circuitry to:
   determine, dependent on the plurality of values in a mapping of optical power measurements to corresponding known in-phase/quadrature skew values, that optical power in a range of power values is more sensitive to in-phase/quadrature skew on the side of the spectrum having a higher frequency with respect to the carrier of the optical signal than on the lower frequency side;
   compare a result of the measurement data from a higher frequency side of the spectrum to the mapping of optical power measurements;
   determine an amount of in-phase/quadrature skew introduced by the optical coherent transponder dependent on a result of the comparison; and
   generate an indication of the determined amount of in-phase/quadrature skew introduced by the optical coherent transponder.

6. The system of claim 5, wherein:
   the optical signal is in a particular optical modulation format; and
   the skew detector further comprises circuitry to:
   store, for each of one or more other optical signals in the particular optical modulation format, each having a respective different known amount of in-phase/quadrature skew, a result of a respective measurement of optical power performed by the optical spectrum analysis, the result of the respective measurement to be stored in association with a skew value representing the respective different known amount of in-phase/quadrature skew in a mapping of optical power measurements to corresponding known in-phase/quadrature skew values.

7. The system of claim 5, wherein:
   the skew detector further comprises circuitry to provide a signal representing a series including alternating values of zeros and ones to the optical coherent transponder as an input; and
   the optical signal transmitted by the optical coherent transponder is a sinusoidal signal or a combination of sinusoidal signals produced by the optical coherent transponder in response to receiving the input.

8. The system of claim 5, wherein:

the skew detector further comprises circuitry to initiate production, by pattern generation circuitry within the optical coherent transponder, of an input signal representing a series including alternating values of zeros and ones; and the optical signal transmitted by the optical coherent transponder is a sinusoidal signal or a combination of sinusoidal signals produced by the optical coherent transponder in response to receiving the input signal.

9. A method for measuring in-phase/quadrature skew, the method comprising:

providing, to an optical spectrum analyzer, an optical signal transmitted by an optical coherent transponder;

generating, using the optical spectrum analyzer, measurement data indicating the optical power for a harmonic of the optical signal with respect to a carrier of the optical signal;

determining, dependent on the plurality of values in a mapping of optical power measurements to corresponding known in-phase/quadrature skew values, that optical power in a range of power values is more sensitive to in-phase/quadrature skew on the side of the spectrum having a lower frequency with respect to the carrier of the optical signal than on the higher frequency side;

comparing a result of the measurement data from a lower frequency side of the spectrum to the mapping of optical power measurements;

determining an amount of in-phase/quadrature skew introduced by the optical coherent transponder dependent on a result of the comparing; and generating an indication of the determined amount of in-phase/quadrature skew introduced by the optical coherent transponder.

10. A system, comprising:

an optical spectrum analyzer comprising circuitry to:
  receive an optical signal transmitted by an optical coherent transponder under test; and
  generate measurement data indicating the optical power for a harmonic of the optical signal with respect to a carrier of the optical signal; and a skew detector comprising circuitry to:
  determine, dependent on the plurality of values in a mapping of optical power measurements to corresponding known in-phase/quadrature skew values, that optical power in a range of power values is more sensitive to in-phase/quadrature skew on the side of the spectrum having a lower frequency with respect to the carrier of the optical signal than on the higher frequency side;
  compare a result of the measurement data from a lower frequency side of the spectrum to the mapping of optical power measurements;
  determine an amount of in-phase/quadrature skew introduced by the optical coherent transponder dependent on a result of the comparison; and
  generate an indication of the determined amount of in-phase/quadrature skew introduced by the optical coherent transponder.

* * * * *